US008848686B1

United States Patent
Cheng et al.

(10) Patent No.: US 8,848,686 B1
(45) Date of Patent: *Sep. 30, 2014

(54) SINGLE CARRIER-FREQUENCY-DIVISION MULTIPLE ACCESS (SC-FDMA) PHYSICAL UPLINK CONTROL CHANNEL (PUCCH) 2/2A/2B DETECTION

(75) Inventors: Shi Cheng, Sunnyvale, CA (US); Ravi Narasimhan, Los Altos, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 491 days.

This patent is subject to a terminal disclaimer.

(21) Appl. No.: 13/080,888

(22) Filed: Apr. 6, 2011

Related U.S. Application Data

(63) Continuation-in-part of application No. 13/023,641, filed on Feb. 9, 2011, which is a continuation-in-part of application No. 12/848,043, filed on Jul. 30, 2010, now Pat. No. 8,416,759.

(51) Int. Cl.
*H04J 3/06* (2006.01)
*H04J 11/00* (2006.01)

(52) U.S. Cl.
USPC .......................................... 370/350; 370/203

(58) Field of Classification Search
CPC ............ H04M 1/00; H03K 9/00; H04B 17/00
USPC ......... 370/203, 208–210, 329, 330, 328, 337,
370/350, 503, 509, 510; 375/346, 260, 285,
375/348, 349, 231; 455/500, 501, 504, 296
See application file for complete search history.

(56) References Cited

U.S. PATENT DOCUMENTS

| | | | | |
|---|---|---|---|---|
| 6,640,088 | B2 * | 10/2003 | Thomas et al. | 455/67.11 |
| 7,117,016 | B2 * | 10/2006 | Kisigami et al. | 455/562.1 |
| 8,238,496 | B1 * | 8/2012 | Narasimhan et al. | 375/346 |
| 8,553,627 | B2 * | 10/2013 | Yin et al. | 370/329 |
| 2010/0067632 | A1 | 3/2010 | Jia | |
| 2010/0260118 | A1 | 10/2010 | Taoka | |
| 2010/0290439 | A1 | 11/2010 | Dai et al. | |
| 2010/0291937 | A1 | 11/2010 | Hu et al. | |
| 2010/0303035 | A1 | 12/2010 | Gao et al. | |
| 2010/0311437 | A1 | 12/2010 | Palanki et al. | |
| 2010/0322114 | A1 | 12/2010 | Li et al. | |
| 2011/0149944 | A1 * | 6/2011 | Ko et al. | 370/344 |

* cited by examiner

*Primary Examiner* — Hanh N Nguyen
(74) *Attorney, Agent, or Firm* — Amin, Turocy & Watson, LLP

(57) ABSTRACT

A system and method are provided for Single Carrier-Frequency-Division Multiple Access (SC-FDMA) Physical Uplink Control Channel (PUCCH) format 2/2a/2b detection. A receiver accepts a plurality of multicarrier signals transmitted simultaneously from a plurality of transmitters, with overlapping carrier frequencies. For each multicarrier signal, a single tap measurement of time delay is performed using a Direction of Arrival (DoA) technique. After performing a back-end processing operation, PUCCH 2/2a/2b format signals are detected. The back-end processing operation is selected from one of the following options: (1) decorrelation, channel estimation, equalization, and decoding per user; (2) channel estimation, equalization, and decoding per user; (3) decorrelation plus maximum likelihood detection (ML) per user; and, (4) ML detection over all users. Selection criteria is also provided.

22 Claims, 8 Drawing Sheets

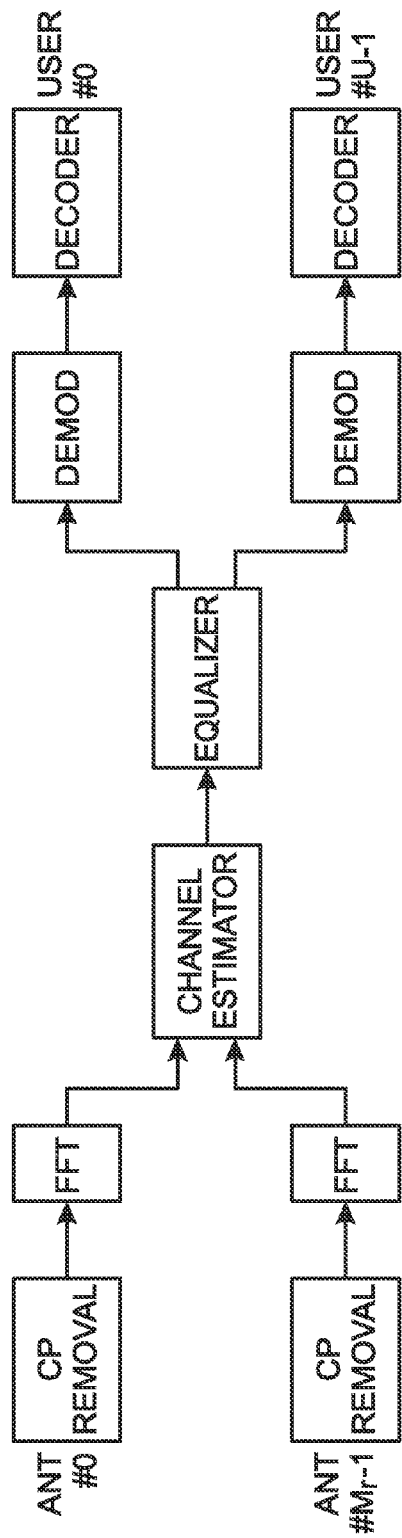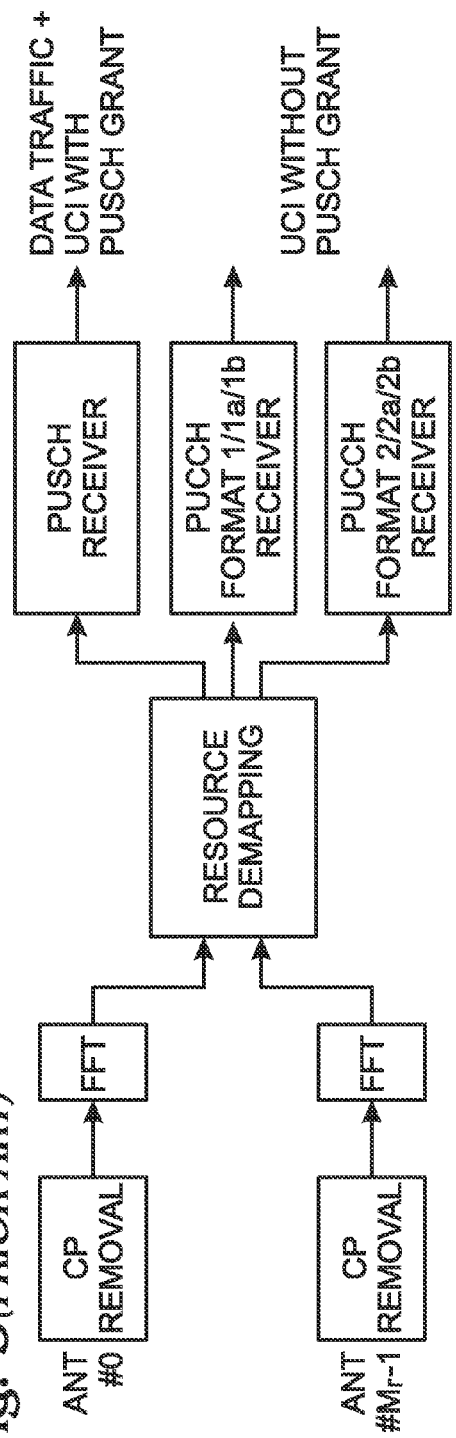

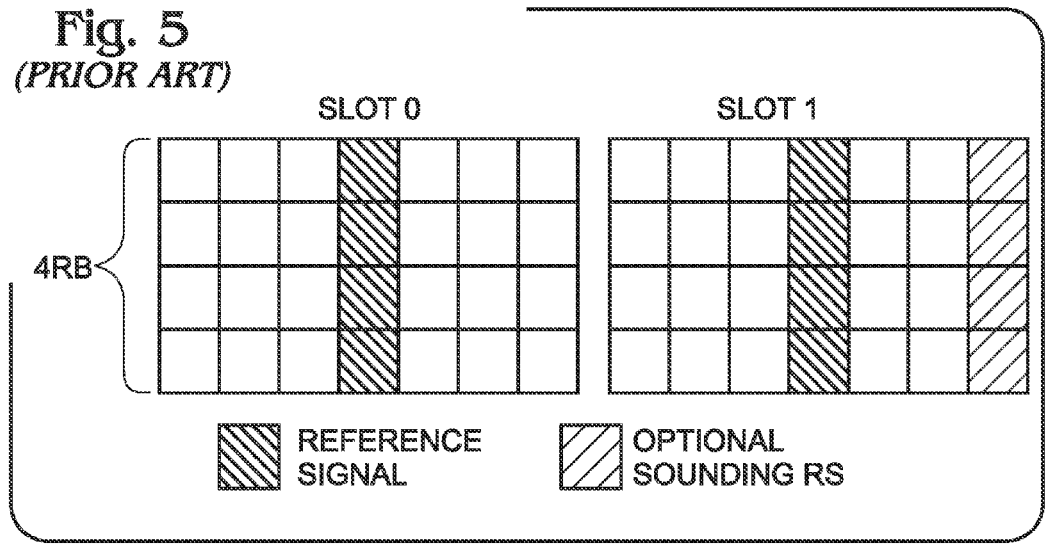
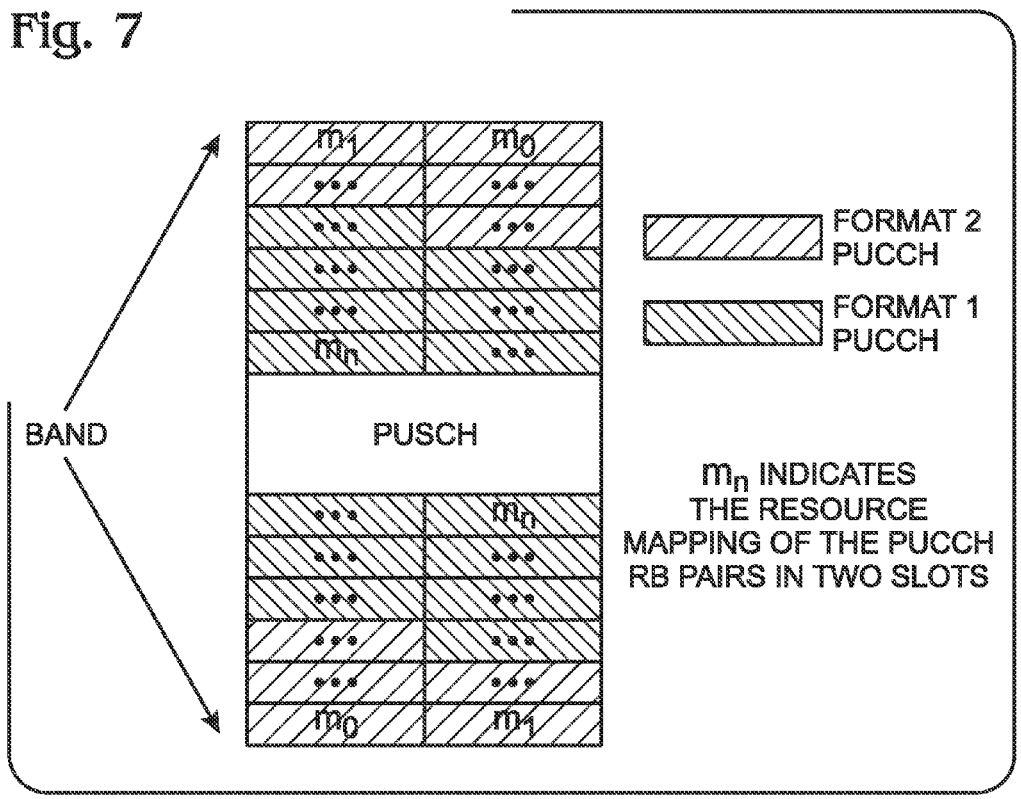

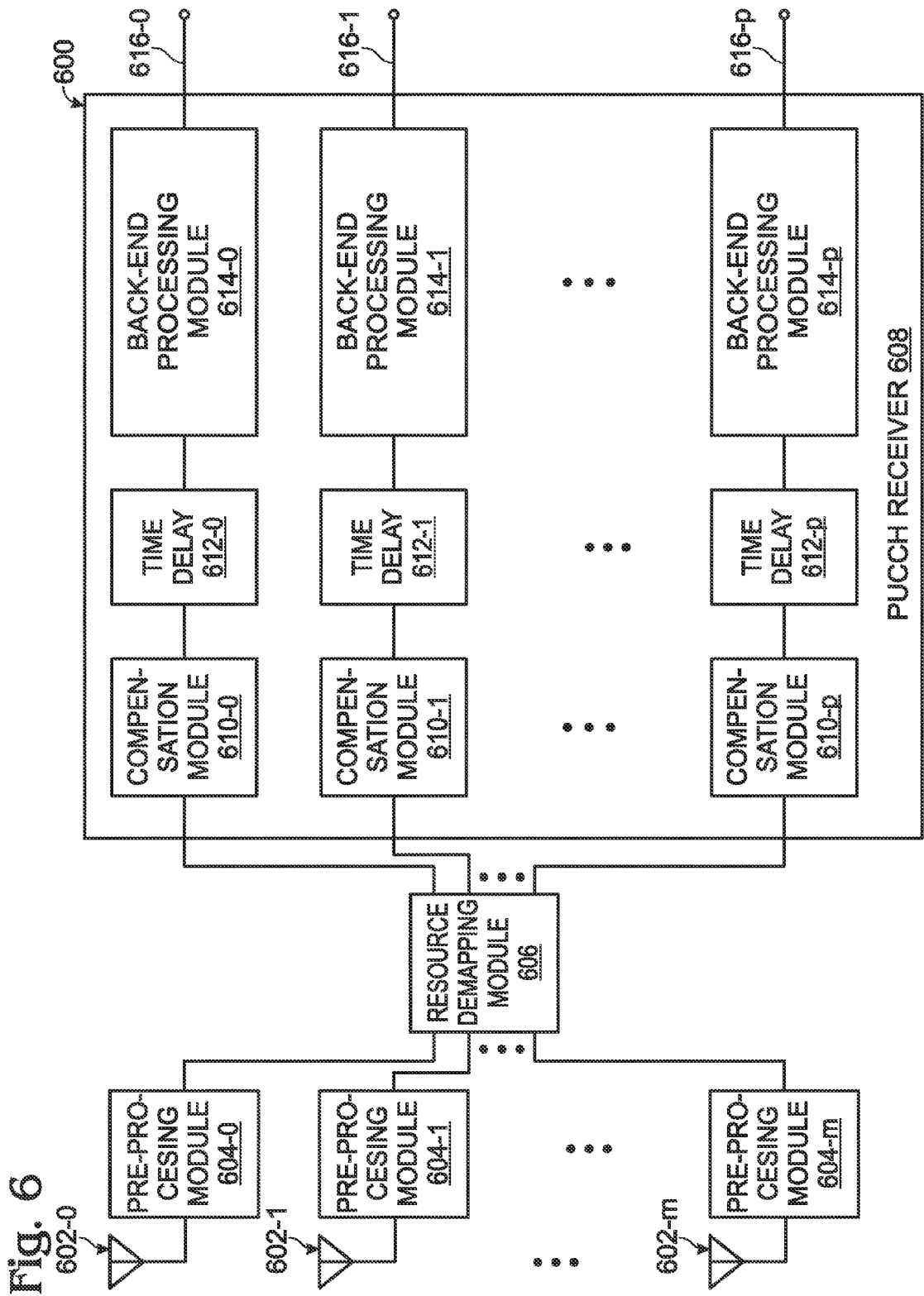

Fig. 10

| CYCLIC SHIFT | $n^{(2)}$PUCCH | CYCLIC SHIFT | $n^{(2)}$PUCCH |
|---|---|---|---|
| 0 | 0 | 0 | 11 |
| 1 | 1 | 1 | 10 |
| 2 | 2 | 2 | 9 |
| 3 | 3 | 3 | 8 |
| 4 | 4 | 4 | 7 |
| 5 | 5 | 5 | 6 |
| 6 | 6 | 6 | 5 |
| 7 | 7 | 7 | 4 |
| 8 | 8 | 8 | 3 |
| 9 | 9 | 9 | 2 |
| 10 | 10 | 10 | 1 |
| 11 | 11 | 11 | 0 |
| SLOT 0 | | SLOT 1 | |

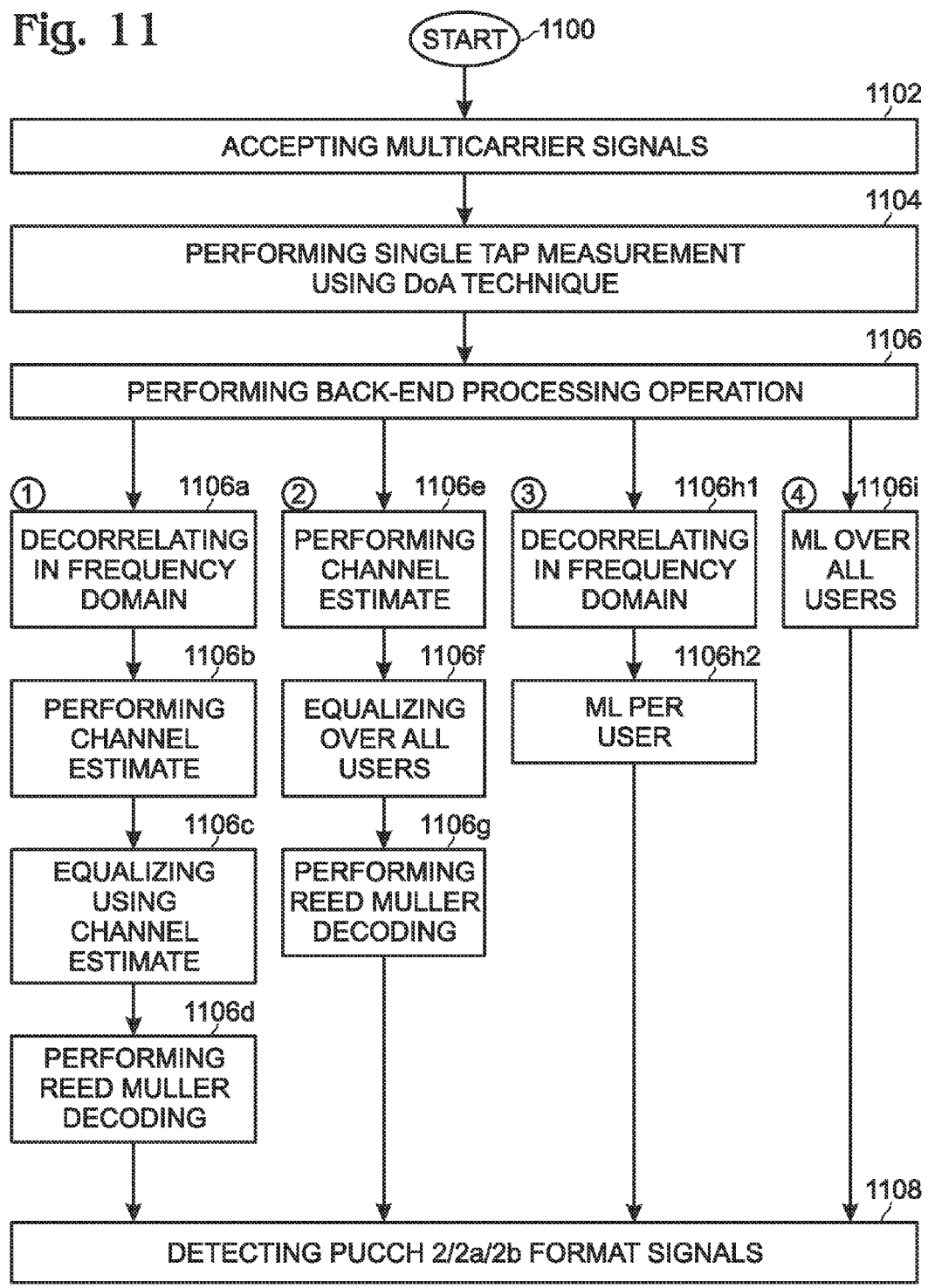

SINGLE CARRIER-FREQUENCY-DIVISION MULTIPLE ACCESS (SC-FDMA) PHYSICAL UPLINK CONTROL CHANNEL (PUCCH) 2/2A/2B DETECTION

RELATED APPLICATIONS

This application is a continuation-in-part of a pending application entitled, SINGLE CARRIER FREQUENCY-DIVISION MULTIPLE ACCESS (SC-FDMA) PHYSICAL UPLINK CONTROL CHANNEL (PUCCH) 1/1A/1B DETECTION, invented by Shi Cheng et al., Ser. No. 13/023,641, filed Feb. 9, 2011;

which is a continuation-in-part of a pending application entitled, CARRIER FREQUENCY OFFSET AND DOPPLER FREQUENCY ESTIMATION AND CORRECTION FOR OFDMA AND SC-FDMA, invented by Ravi Narasimhan et al., Ser. No. 12/848,043, filed Jul. 30, 2010 now U.S. Pat. No. 8,416,759. Both these applications are incorporated herein by reference.

BACKGROUND OF THE INVENTION

1. Field of the Invention

This invention generally relates to Single Carrier Frequency Division Multiple Access (SC-FDMA) communications, and more particularly, to system and method for detecting signals in the Physical Uplink Control Channel PUCCH 2/2a/2b format.

2. Description of the Related Art

UL: Uplink
LTE: Long Term Evolution (3GPP term for next-generation cellular standard)
OFDMA: Orthogonal Frequency Division Multiple Access
SC-FDMA: Single Carrier Frequency Division Multiple Access
MIMO: Multiple-Input Multiple-Output
MU-MIMO: Multi-user Multiple Input Multiple Output
DoA: Direction of Arrival
TO: Timing Offset
ACK: Acknowledgement
NACK: Negative Acknowledgement
DTX: Discontinued Transmission
SR: Scheduling Request
SRS: Sounding Reference Signals (used to sound the frequency band)
AWGN: Additive White Gaussian Noise
eNodeB: Enhanced NodeB (LTE base station)
CQI: Channel Quality Indicator
RI: Rank Indicator
UE: User Equipment
UCI: Uplink Control Information
PUCCH: Physical Uplink Control Channel
PUSCH: Physical Uplink Shared Channel
RB: Resource Block FIG. 1 is a diagram depicting a Multiuser MIMO (MU-MIMO) wireless communication system (prior art). Multiple users can transmit data simultaneously at the same frequency to a multi-antenna base station, resulting in increased aggregate cell throughput. There is a need to decouple data streams from different users via MU-MIMO equalization, which requires MU-MIMO channel estimation.

FIG. 2 is a diagram depicting an exemplary MIMO receiver (prior art). Channel estimation is needed in multi-user and single-user MIMO receivers to separate different spatial streams and/or user signals via equalization. Of special interest is OFDMA and SC-FDMA multi-user MIMO channel estimation with a single spatial stream per user (e.g., LTE uplink). After cyclic prefix (CP) removal and a fast Fourier transform (FFT), the input to the channel estimator block is the received frequency domain signal of reference symbols from Mr number of receive antennas. The outputs are channel responses in the frequency domain from user u ($1 \le u \le U$) to antenna m ($0 \le m \le Mr-1$) are demodulated (demod) and decoded.

FIG. 3 is a schematic block diagram of a MIMO receiver differentiating between data and control channel receiver functions (prior art). PUCCH in LTE carries uplink control information (UCI), such as CQI, RI, ACK/NACK, and SR. Each user (UE) has a PUSCH grant, CQI, RI, ACK/NACK are multiplexed, with or without data traffic, on PUSCH. Otherwise, they are sent on PUCCH. PUCCH is the uplink control channel in LTE, in which each UE sends SR or ACK/NACK to a downlink traffic node. Different users may be multiplexed on the same resource block RB pairs in an orthogonal way. However, the orthogonality may be lost due to each user's timing offset, multipath fading channel, Doppler shift, and carrier frequency offset.

Most of the current methods ignore different users' timing offsets. Although each user's signal is decorrelated and detected, the desired signal may be degraded by other user signals because the orthogonality is lost at the receiver side. There are methods that attempt to estimate the multipath path channel per user. However, the estimation requires knowledge of channel covariance matrix, which is generally unknown. With a large number of multiplexed users, the estimation becomes very complicated. Also, conventional methods cannot handle high Doppler shift or CFO for all cases.

FIG. 4 is a diagram depicting a subframe consisting of two slots, as is used in Long Term Evolution (LTE) (prior art). LTE is the Third Generation Partnership Program (3GPP) term for the next generation cellular standard. The figure shows two resource blocks (RBs), with one resource block per slot. Each slot includes seven OFDMA or SC-FDMA symbols for normal CP, or 6 symbols for extended CP, at twelve subcarrier frequencies. In OFDMA and SC-FDMA, each user is allocated resource elements (REs) in time and frequency. SC-FDMA is similar to OFDMA except that user data are spread via a discrete Fourier transform (DFT) before OFDMA modulation. Each resource element consists of 1 subcarrier in the frequency domain and 1 OFDMA or SC-FDMA symbol in the time domain. User data modulates the amplitude and phase of each subcarrier for the duration of 1 OFDMA or SC-FDMA symbol. Multiple users can modulate the same RE (MU-MIMO). In the LTE uplink, each user transmits reference signals on all REs of specified symbols. Different user reference signals are multiplexed using different cyclic shifts. The base station uses the reference signals to estimate a channel for each user.

SC-FDMA is a multi-user version of a single carrier frequency domain multiplexing modulation scheme. SC-FDMA can be viewed as a linearly precoded OFDMA scheme, henceforth LP-OFDMA. FDE is the equalizer at receiver end. It is different from the modulation scheme. Or, it can be viewed as a single carrier multiple access scheme. Just like in OFDM, guard intervals with cyclic repetition are introduced between blocks of symbols in view to efficiently eliminate time spreading (caused by multi-path propagation) among the blocks. In OFDM, a Fast Fourier transform (FFT) is applied on the receiver side on each block of symbols, and inverse FFT (IFFT) on the transmitter side. In SC-FDMA, both FFT and IFFT are applied on the transmitter side, and also on the receiver side.

In OFDM as well as SC-FDMA, equalization is achieved on the receiver side after the FFT calculation, by multiplying each Fourier coefficient by a complex number. Thus, frequency-selective fading and phase distortion can be combated. The advantage is that FFT and frequency domain equalization requires less computation power than conventional time-domain equalization. In SC-FDMA, multiple access is made possible by inserting Fourier-coefficients on the transmitter side before the IFFT, and removing them on the receiver side after the FFT. Different users are assigned to different Fourier-coefficients (subcarriers).

LTE uses OFDMA for the downlink—that is, from the base station to the terminal. In the time domain the radio frame is 10 ms long and consists of 10 sub frames of 1 ms each. In LTE with frequency-division duplexing (FDD), every sub frame consists of 2 slots where each slot is 0.5 ms. The subcarrier spacing in the frequency domain is 15 kHz and there are modes with 7.5 kHz subcarrier spacing. In the 15 kHz mode, twelve of these subcarriers together (per slot) are called a resource block, so one resource block is 180 kHz. 6 Resource blocks fit in a carrier of 1.4 MHz and 100 resource blocks fit in a carrier of 20 MHz. In the uplink, for the Physical Uplink Shared channel (PUSCH) only, LTE uses a pre-coded version of OFDMA called SC-FDMA to compensate for a drawback with normal OFDMA, which has a very high peak-to-average power ratio (PAPR). High PAPR requires expensive and inefficient power amplifiers with high requirements on linearity, which increases the cost of the terminal and drains the battery faster. SC-FDMA solves this problem by grouping together the resource blocks in a way that reduces the need for linearity, and so power consumption, in the power amplifier. A low PAPR also improves coverage and the cell-edge performance.

In MIMO systems, a transmitter sends multiple streams by multiple transmit antennas. The transmit streams go through a matrix channel which consists of all paths between the transmit antennas at the transmitter and receive antennas at the receiver. Then, the receiver gets the received signal vectors by the multiple receive antennas and decodes the received signal vectors into the original information. A narrowband flat fading MIMO system is modeled as:

$$y=Hx+n$$

where y and x are the receive and transmit vectors, respectively, and H and n are the channel matrix and the noise vector, respectively. Where x is a Mt×1 vector, y and n are Mr×1 vectors.

With respect to MU-MIMO channel estimation for OFDMA/SC-FDMA, user reference signals with different cyclic shifts are orthogonal across a number of tones in ideal scenarios (no timing offset and low delay spread). In this case, channel estimation for each user is decoupled. Several channel estimation techniques exist in prior art, such as least squares, minimum mean-square error (MMSE), discrete cosine transform (DCT), can be used under the orthogonality assumption. In practice, orthogonality is destroyed because of different user timing offsets and/or medium to high delay spreads.

FIG. 5 is a drawing depicting uplink reference signals in LTE (normal cyclic prefix) (prior art). The reference signals of the different users are orthogonal across a number of tones if the same base sequence is used and each user applies a unique cyclic shift. The demodulation reference signal (DM-RS) for each slot is assigned SC-FDMA symbol index 0. The DM-RS symbol is the phase reference since the equalizer is computed at the DM-RS symbol. Thus, degradation from phase rotation is worse for constellations in symbols further in time from the DM-RS symbol. The duration of each SC-FDMA symbol is Tsym. The duration of each slot is Tslot.

It would be advantageous if the orthogonality between users in PUCCH protocol transmissions could be compensated for by initially estimating each user's timing offset, and using the estimated timing offsets for decorrelation.

SUMMARY OF THE INVENTION

Described herein is a process that uses a combination of different methods to improve the performance of CQI (Channel Quality Indicator) and ACK/NACK (acknowledgement/negative acknowledgement) error rates in Single Carrier Frequency Division Multiple Access (SC-FDMA) Physical Uplink Control Channel PUCCH 2/2a/2b format communications. Conventional methods typically ignore the different users' timing offsets. Although each user's signal is decorrelated and detected, the desired signal may be degraded because of the loss of orthogonality between signals. Other conventional methods try to estimate the multipath path channel per user. However, the estimation requires knowledge of channel covariance matrix, which is generally unknown. With a large number of multiplexed users, the estimation becomes very complicated. Further, these methods cannot handle high Doppler shift for all cases. The disclosed process can be used in a Long Term Evolution (LTE) eNodeB receiver such that lower error rate of CQI and ACK/NACK can be achieved in the uplink. The disclosed process can be used in current, Release 8, Release 9, and future LTE advanced standards (e.g., LTE Release 10 and beyond).

Accordingly, a method is provided for SC-FDMA PUCCH format 2/2a/2b detection. A receiver accepts a plurality of multicarrier signals transmitted simultaneously from a plurality of transmitters, with overlapping carrier frequencies. For each multicarrier signal, a single tap measurement of time delay is performed using a Direction of Arrival (DoA) technique. After performing a back-end processing operation, PUCCH 2/2a/2b format signals are detected.

The back-end processing operation is selected from one of the following set of operations: (1) decorrelation, channel estimation per user, equalization per user, and decoding per user; (2) channel estimation, equalization, and decoding per user; (3) decorrelation plus maximum likelihood detection (ML) per user; and, (4) ML detection over all users.

Additional details of the above-described detection method, and a wireless communications receiver with a system for Single Carrier-Frequency-Division Multiple Access (SC-FDMA) Physical Uplink Control Channel (PUCCH) format 2/2a/2b detection, are provided below.

BRIEF DESCRIPTION OF THE DRAWINGS

FIG. 2 is a diagram depicting an exemplary MIMO receiver (prior art).

FIG. 3 is a schematic block diagram of a MIMO receiver differentiating between data and control channel receiver functions (prior art).

FIG. 5 is a drawing depicting uplink reference signals in LTE (normal cyclic prefix) (prior art).

FIG. 6 is a schematic block diagram of a wireless communications receiver with a system for Single Carrier-Frequency-Division Multiple Access (SC-FDMA) Physical Uplink Control Channel (PUCCH) format 2/2a/2b detection.

FIG. 7 is a schematic diagram depicting PUCCH resource block allocation.

FIG. 10 is a diagram depicting user multiplexing in PUCCH format 2/2a/2b.

FIG. 11 is a flowchart illustrating a method for SC-FDMA PUCCH format 2/2a/2b detection in a wireless communications receiver.

DETAILED DESCRIPTION

Figure 1:
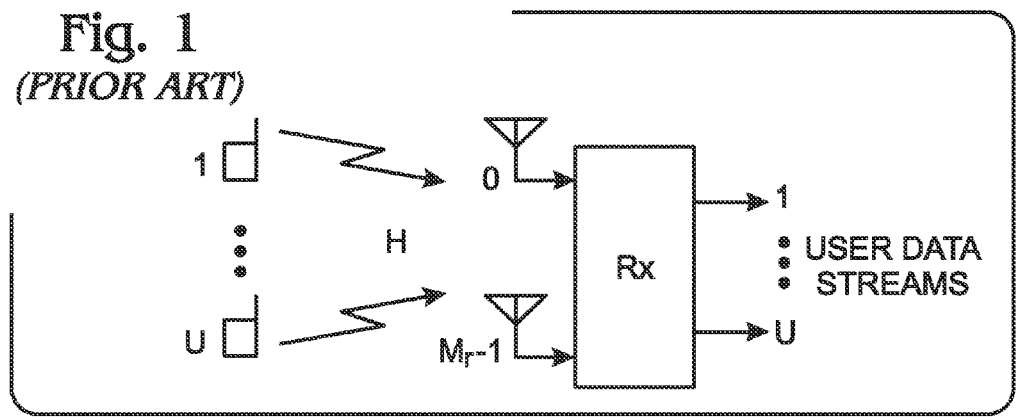
FIG. 1 is a diagram depicting a Multiuser MIMO (MU-MIMO) wireless communication system (prior art).
Figure 4:
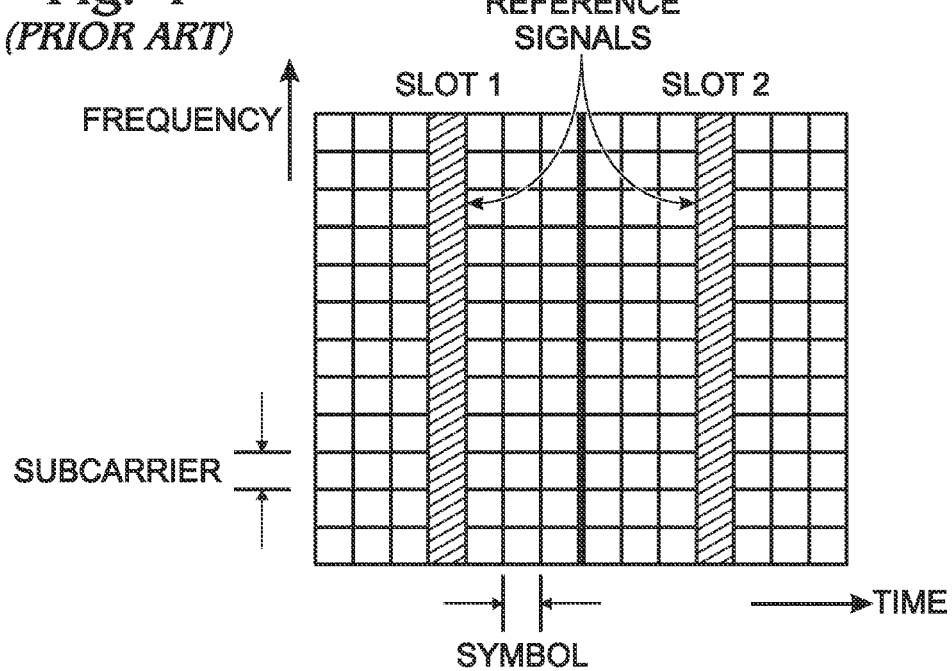
FIG. 4 is a diagram depicting a subframe consisting of two slots, as is used in Long Term Evolution (LTE) (prior art).

As used in this application, the terms "component," "module," "system," and the like may be intended to refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The receiver devices described below typically employ a computer system with a bus or other communication mechanism for communicating information, and a processor coupled to the bus for processing information. The computer system may also include a main memory, such as a random access memory (RAM) or other dynamic storage device, coupled to the bus for storing information and instructions to be executed by processor. These memories may also be referred to as a computer-readable medium. The execution of the sequences of instructions contained in a computer-readable medium may cause a processor to perform some of the steps associated with position calculation. Alternately, these functions, or some of these functions may be performed in hardware. The practical implementation of such a computer system would be well known to one with skill in the art.

As used herein, the term "computer-readable medium" refers to any medium that participates in providing instructions to a processor for execution. Such a medium may take many forms, including but not limited to, non-volatile media, and volatile media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

FIG. 6 is a schematic block diagram of a wireless communications receiver with a system for Single Carrier-Frequency-Division Multiple Access (SC-FDMA) Physical Uplink Control Channel (PUCCH) format 2/2a/2b detection. The system 600 comprises a plurality of antennas 602 accepting a plurality of multicarrier signals transmitted simultaneously from a plurality of transmitters, with overlapping carrier frequencies. Shown are antennas 602-0 through 602-m, where m is an integer value not limited to any particular value. Also shown is a plurality of pre-processing modules 604-0 through 604-m, each connected to a corresponding antenna 602 to perform cyclic prefix (CP) removal and a fast Fourier transform (FFT) for each multicarrier signal. A resource demapping module 606 is connected to the pre-processing modules 604 and has an output connected to a PUCCH receiver 608.

Each of the plurality of antennas 602 receives a signal of one slot on the mth antenna, kth frequency tone, and ith SC-FDMA symbol as follows:

$$v_m(k,i) = \sum_{u=0}^{U-1} H_m^{(u)}(k,i) e^{j2\pi k \Delta_f (\Delta^{(u)} + \Delta_{cell}(i))/12} w^{(u)}(i) s^{(u)}(i) r_{rs}(k) + n_m(k,i)$$

where U is the number of multiplexed users;

$H_m^{(u)}(k,i)$ is the channel response on the kth tone of the uth user at the ith symbol on the mth antenna;

$\Delta_{cell}(i)$ is the cell specific cyclic shift on the ith symbol;

$r_{rs}(k)$ is the reference signal on the kth tone;

$\Delta_f$ is the subcarrier spacing, 15 KHz; and, $w^{(u)}(i)$ is the orthogonal code on the ith symbol.

The PUCCH receiver 608 includes a plurality of compensation modules 610-0 through 610-p, for compensating cyclic shift and reference signals. A plurality of single tap time delay estimators 612-0 through 612-p is shown, each connected to a corresponding compensation module 610. Each single tap time delay estimator 612 performs a single tap measurement of time delay for a corresponding multicarrier signal using a Direction of Arrival (DoA) technique. A plurality of back-end processing modules 614-0 through 614-p, each connected to a corresponding single-tap time delay estimator 612, detect PUCCH 2/2a/2b format signals supplied at an output on corresponding lines 616-0 through 616-p.

Each back-end processing module 614 perform one of the following set of operations: (1) decorrelation, channel estimation per user, equalization per user, and decoding per user; (2) channel estimation, equalization, and decoding per user; (3) decorrelation plus maximum likelihood detection (ML) per user; or, (4) ML detection over all users.

The single-tap time delay estimators 612 use a DoA technique such as classic beamforming, Capon beamforming, MUltiple SIgnal Classification (MUSIC), estimation of signal parameters via rotational invariance techniques (ESPRIT), alternating projection, or simplified projection.

In one aspect, the single-tap time delay estimators 612 approximate each multicarrier signal as follows:

$$z_m(i) = AH_m(i)s(i) + n_m(i)$$

where i=0, 1, ..., N−1, where N is the number of symbols per slot in time domain $$A = \left[ a\left(\tau^{(u_0)}\Delta_f - \frac{\Delta^{(u_0)}}{12}\right), \ldots, a\left(\tau^{(u_{K-1})}\Delta_f - \frac{\Delta^{(u_{K-1})}}{12}\right) \right]$$

$$a(t) = [1 \quad e^{-j2\pi t} \quad \ldots \quad e^{-j2\pi 11 t}]^T$$

where $u_0, \ldots, u_{K-1}$ are the indexes of the users;

where A includes steering vectors corresponding to user $u_0, \ldots, u_{K-1}$;

where $H_m(i)$ is a diagonal matrix whose elements are the single tap channel responses on the ith symbol on the mth antenna of user $u_0, \ldots, u_{K-1}$;

where a(t) is a length 12 steering vector where $\tau$ is a tap delay of a particular user where $\Delta$ is a cyclic shift of a particular user;

where s(i) is the transmitted data or pilot on the ith symbol corresponding to user $u_0, \ldots, u_{K-1}$; and, where $n_m(i)$ is the noise vector on the ith symbol and mth antenna.

In another aspect, the single-tap time delay estimators 612 use the classic beamforming algorithm by building statistics for slot pairs, including data and pilot signal from each antennas in each slot, as follows:

$$\tilde{Z} = [z_0(0), z_1(0), \ldots, z_{M-1}(0), \ldots, z_0(N-1), z_1(N-1), \ldots z_{M-1}(N-1)]$$

computing metrics $$\lambda^{(u)}(\tau) = \left\| \tilde{Z} a^H \left( \tau\Delta_f - \frac{\Delta^{(u)}}{12} \right) \right\|^2,$$

where a is the steering vector;

peak picking to estimate $\tau^{(u)}$ using computed spectrums from both slot within a given range $$\hat{\tau}^{(u)} = \arg \max_{\tau \in [\tau_{min}, \tau_{max}]} \lambda^{(u)}_{s_0}(\tau) + \lambda^{(u)}_{s_1}(\tau)$$

where the subscripts $s_0$ and $s_1$ represents slot 0 and slot 1.

In another aspect, the single-tap time delay estimators 612 use the alternating projection algorithm by building statistics for slot pairs, including data and pilot signal from each antenna in each slot, as follows:

for each user, setting initial estimates to $\hat{\tau}^{(u)}$;

iteratively update each user's estimate $$\hat{\tau}^{(u)} = \arg \max_{\tau \in [\tau_{min}, \tau_{max}]} \lambda^{(u)}_{s_0}(\tau) + \lambda^{(u)}_{s_1}(\tau)$$

where the subscripts $s_0$ and $s_1$ represents slot 0 and slot 1, computing a spectrum, per slot, based on steering vectors projected onto the null space of $$\left\{ a\left(\tau^{(\tilde{u}_0)}\Delta_f - \frac{\Delta^{(\tilde{u}_0)}}{12}\right), \ldots, a\left(\tau^{(\tilde{u}_{K-2})}\Delta_f - \frac{\Delta^{(\tilde{u}_{K-2})}}{12}\right) \right\}$$

where $\tilde{u}_0, \ldots, \tilde{u}_{K-2}$ are all users but excluding u, given $$\tilde{A}_u = \left[ a\left(\tau^{(\tilde{u}_0)}\Delta_f - \frac{\Delta^{(\tilde{u}_0)}}{12}\right), \ldots, a\left(\tau^{(\tilde{u}_{K-2})}\Delta_f - \frac{\Delta^{(\tilde{u}_{K-2})}}{12}\right) \right]$$

computing a projection matrix $$P_u = I - \tilde{A}_u(\tilde{A}_u^H \tilde{A}_u)^{-1} \tilde{A}_u^H$$

projecting and normalizing a steering vector $$b_u(\theta) = \frac{P_u a(\theta)}{\|P_u a(\theta)\|}$$

computing $$\lambda^{(u)}(\tau) = \left\| \tilde{Z} b_u^H \left( \tau\Delta_f - \frac{\Delta^{(u)}}{12} \right) \right\|^2$$

and updating $\tilde{\tau}^{(u)}$ and, repeating the above-listed steps until a stopping criteria is met.

In another aspect, the single-tap time delay estimators 612 use the simplified projection algorithm by building statistics for slot pairs, including data and pilot signal from each antennas in each slot, as follows:

setting a common initial estimate for each user;

for each user, using the simplified projection method to estimate $\tilde{\tau}^{(u)}$, given initial estimates $$b_u(\theta) = \frac{P_u a(\theta)}{\|P_u a(\theta)\|}$$

$$P_u = I - \tilde{A}_u(\tilde{A}_u^H \tilde{A}_u)^{-1} \tilde{A}_u^H$$

where $\tilde{A}_u$ has orthogonal rows and $\tilde{A}_u^H \tilde{A}_u$ is a simple identity matrix.

For example, (1) decorrelation, channel estimation per user, equalization per user, and decoding per user, has a first level of complexity and first level of performance, when the number of users is not less than $T_U$, and the user's $N_{CQI} + N_{ACK} \geq T_{info}$.

(2) channel estimation, equalization, and decoding per user, has a second level of complexity, greater than the first level, and a second level of performance, greater than the first level, when the number of users is less than $T_U$.

(3) decorrelation (in the frequency domain) plus ML per user may be used when the number of users is not less than $T_U$, and the user's $N_{CQI} + N_{ACK} < T_{info}$.

(4) ML detection for all users, has a third level of complexity, greater than the second level, and a third level of performance, greater than the second level, and may be used when the number of multiplexed users is less than $T_{U,ML}$, and the sum of users' information bits is less than $T_{info,ML}$.

In one aspect, the back-end processors 614 initially attempt to select (4) ML detection for all users, and in response to not meeting conditions for use, select a back-end processing operation selected from: (1) decorrelation, channel estimation per user, equalization per user, and decoding per user, (2) channel estimation, equalization, and decoding per user, and (3) decorrelation plus ML per user.

If (1) decorrelation, channel estimation per user, equalization per user, and decoding per user is selected, the back-end processor decorrelates in the frequency domain using a corresponding cyclic shift; performs a channel estimation for each user; performs equalizing using the channel estimate on decorrelated signal for each user; and, performs Reed Muller decoding for each user.

More explicitly, decorrelating in the frequency domain includes:

given tap delay estimates, modeling different users' signal as $$z_m(i) = \hat{A} H_m(i) s(i) + n_m(i)$$

where each user's signal is decorrelated by multiplying the pseudoinverse of $\hat{A}$ on left side, and for the uth user obtaining $$y_m^{(u)}(i) = h_m^{(u)}(i) s^{(u)}(i) + n_m^{(u)}(i)$$

where $\hat{A}$ differs in two slots, so that the pseudoinverse is computed twice.

Then, performing the channel estimate includes:

after decorrelation, for each slot, combining $y_m^{(u)}(i)$, where i is the index of pilot symbols.

For format 2 normal CP, in slot 0, performing one of the two following operations, the first being averaging the channel over $$y_m^{(u)}(1), y_m^{(u)}(5)$$

$$h_m^{(u)}(i) = \frac{1}{2}(y_m^{(u)}(1) + y_m^{(u)}(5)), i = 0, 2, 3, 4, 6$$

and interpolating over $y_m^{(u)}(1), y_m^{(u)}(5)$ $$h_m^{(u)}(i) = \frac{5-i}{4} y_m^{(u)}(1) + \frac{i-1}{4} y_m^{(u)}(5), i = 0, 2, 3, 4, 6$$

For format 2a/2b in normal CP, using $$h_m^{(u)}(i) = y_m^{(u)}(1), i = 0, 2, 3, 4, 6$$

detecting extra ACK/NACK symbols $s_d(10)$, then $$h_m^{(u)}(i) = \frac{1}{2}(y_m^{(u)}(1) + y_m^{(u)}(5) s_d(10)^*), i = 0, 2, 3, 4, 6$$

Alternatively, for format 2 extended CP, in slot 0, using $$h_m^{(u)}(i) = y_m^{(u)}(3), i = 0, 1, 2, 4, 5, \text{ and,}$$

estimating the channel for slot 1 similarly.

Assuming each user's timing offset, cyclic shift, and data symbols are decorrelated as the pilot symbols, and given the channel estimation, and decorrelated signal, the equation per user is as, $$\hat{s}(i) = \sum_{m=0}^{M-1} w_m^{(u)}(i)^* y_m^{(u)}(i)$$

with a MRC equalization of $$w_m^{(u)}(i) = \frac{\hat{h}_m^{(u)}(i)^*}{\sum_{m=0}^{M-1} |\hat{h}_m^{(u)}(i)|^2}.$$

If (2) channel estimation, equalization, and decoding per user is used, the back-end processing module performs a channel estimation; performs equalization over all users (no frequency domain decorrelation being done first); and, performs Reed Muller decoding for each user.

More explicitly, the back-end processor performs the channel estimation as follows:

for the mth antenna, modeling the signal as $$z_m(i) = \hat{A} H_m(i) s(i) + n_m(i)$$

starting from subcarrier k, grouping P consecutive subcarriers, where $P \geq U$ $$\tilde{z}_{m,k}(i) = \tilde{A}_k H_{m,k}(i) s(i) + n_m(i)$$

where $\tilde{z}_{m,k}$ consists of the kth till k+P−1 th entries of $z_m$ and $\tilde{A}_k$ consists the kth till k+P−1 th rows of $\hat{A}$ on pilot symbols, $$h_{m,k+(P-1)/2}(i) = \tilde{A}_k^+ \tilde{z}_{m,k}(i)$$

where the elements in h correspond to the diagonal elements in H then multiple set of channel estimations can be acquired by varying k from the integers of [0, 12−P] and a frequency domain filter is applied to smoothen the estimates.

If (3) decorrelation plus ML per user is used, the back-end processing module 614 decorrelates in the frequency domain using a corresponding cyclic shift as follows:

given tap delay estimates, modeling different users' signal as $$z_m(i) = \hat{A} H_m(i) s(i) + n_m(i)$$

where each user's signal is decorrelated by multiplying the pseudoinverse of $\hat{A}$ on left side, and for the uth user obtaining $$y_m^{(u)}(i) = h_m^{(u)}(i) s^{(u)}(i) + n_m^{(u)}(i)$$

where $\hat{A}$ differs in two slots, so that the pseudoinverse is computed twice.

Then, ML detection for each user is obtained by:

dropping the superscript (u), for normal CP mode, writing symbols in the first slot as $$\begin{bmatrix} y_0(0) & \ldots & y_0(6) \\ \ldots & \ldots & \ldots \\ y_{M-1}(0) & \ldots & y_{M-1}(6) \end{bmatrix} = \begin{bmatrix} h_0(0) & \ldots & h_0(6) \\ \ldots & \ldots & \ldots \\ h_{M-1}(0) & \ldots & h_{M-1}(6) \end{bmatrix} \begin{bmatrix} s(0) & & \\ & \ddots & \\ & & s(6) \end{bmatrix} + \text{noise}$$

and for extended CP as $$\begin{bmatrix} y_0(0) & \ldots & y_0(5) \\ \ldots & \ldots & \ldots \\ y_{M-1}(0) & \ldots & y_{M-1}(5) \end{bmatrix} = \begin{bmatrix} h_0(0) & \ldots & h_0(5) \\ \ldots & \ldots & \ldots \\ h_{M-1}(0) & \ldots & h_{M-1}(5) \end{bmatrix} \begin{bmatrix} s(0) & & \\ & \ddots & \\ & & s(5) \end{bmatrix} + \text{noise}$$

decomposing a channel matrix of either $$\begin{bmatrix} h_0(0) & \ldots & h_0(6) \\ \ldots & \ldots & \ldots \\ h_{M-1}(0) & \ldots & h_{M-1}(6) \end{bmatrix} = \tilde{H} G$$

for normal CP or, $$\begin{bmatrix} h_0(0) & \ldots & h_0(5) \\ \ldots & \ldots & \ldots \\ h_{M-1}(0) & \ldots & h_{M-1}(5) \end{bmatrix} = \tilde{H} G$$

for extended CP mode.

Rewriting the previous equation as $$Y = \tilde{H} G S + W$$

where W is noise with covariance matrix R.

In normal CP, choosing G to be a 2×7 matrix or a 1×7 matrix, representing a linearly varying channel or a constant channel, respectively, as follows:

In extended CP mode, choosing G to either a 2×6 matrix or a 1×6 matrix, representing a linearly varying channel or a constant channel, respectively, $$G = \begin{bmatrix} 1 & 4/5 & 3/5 & 2/5 & 1/5 & 0 \\ 0 & 1/5 & 2/5 & 3/5 & 4/5 & 1 \end{bmatrix}$$

$$G = \begin{bmatrix} 1 & 1 & 1 & 1 & 1 \end{bmatrix}$$

given S,
$\tilde{H}$ is estimated as $$\tilde{H} = YS^H G^T (GG^T)^{-1}$$

S is searched to perform either minimizing $$L = \sum_{slot=0}^{1} \left\| R^{-\frac{1}{2}} YS^H \left( I - G^T (GG^T)^{-1} G \right) S \right\|_F^2$$

or maximizing $$\sum_{slot=0}^{1} Tr\left(YS^H G^T (GG^T)^{-1} GSY^H R^{-1}\right)$$

If (4) ML over all users is used, the back-end processing module rewrites the ith symbol as $$\begin{bmatrix} z_0(i) \\ \vdots \\ z_{M-1}(i) \end{bmatrix} = \begin{bmatrix} \hat{A} H_0(i) \\ \vdots \\ \hat{A} H_{M-1}(i) \end{bmatrix} s(i) + \begin{bmatrix} n_0(i) \\ \vdots \\ n_{M-1}(i) \end{bmatrix}$$

$$= \begin{bmatrix} \hat{A} & & \\ & \ddots & \\ & & \hat{A} \end{bmatrix} \begin{bmatrix} S(i) & & \\ & \ddots & \\ & & S(i) \end{bmatrix} \begin{bmatrix} h_0(i) \\ \vdots \\ h_{M-1}(i) \end{bmatrix} + \begin{bmatrix} n_0(i) \\ \vdots \\ n_{M-1}(i) \end{bmatrix}$$

where S(i) is the diagonal matrix whose diagonal entries consist of all corresponding elements of s(i);

defining $\tilde{z}, \tilde{A}, \tilde{S}, \tilde{h}, \tilde{n}(i)$ as shown in the above equation, and $$G = \begin{bmatrix} 1 & 5/6 & 4/6 & 3/6 & 2/6 & 1/6 & 0 \\ 0 & 1/6 & 2/6 & 3/6 & 4/6 & 5/6 & 1 \end{bmatrix}$$

$$G = \begin{bmatrix} 1 & 1 & 1 & 1 & 1 \end{bmatrix}$$

therefore $$\tilde{z}(i) = \tilde{A} \tilde{S}(i) \tilde{h}(i) + \tilde{n}(i)$$

solving for all possible $s^{(u)}(i)$ that minimize $$L = \sum_{slot=0}^{1} \sum_{i=0}^{N-1} \left\| \tilde{z}(i) - \tilde{A} \tilde{S}(i) \tilde{h}(i) \right\|^2$$

assuming the channel is constant over one slot, $$\begin{bmatrix} \tilde{z}(0) \\ \vdots \\ \tilde{z}(N-1) \end{bmatrix} = \begin{bmatrix} \tilde{A} \tilde{S}(0) \\ \vdots \\ \tilde{A} \tilde{S}(N-1) \end{bmatrix} \tilde{h} + \begin{bmatrix} \tilde{n}(0) \\ \vdots \\ \tilde{n}(N-1) \end{bmatrix}$$

where N is the number of symbols per slot; using the solution of $s^{(u)}(i)$ to maximize $$\tilde{L} = \sum_{slot=0}^{1} \left( \sum_{i=0}^{N-1} \tilde{z}(i)^H \tilde{A} \tilde{S}(i) \right) \left( \sum_{i=0}^{N-1} \tilde{S}(i)^H \tilde{A}^H \tilde{A} \tilde{S}(i) \right)^{-1} \left( \sum_{i=0}^{N-1} \tilde{S}(i)^H \tilde{A}^H \tilde{z}(i) \right).$$

Functional Description

FIG. 7 is a schematic diagram depicting PUCCH resource block allocation. Allocation per RB pair, always occurs on the edges of the band. From the edges, format 2/2a/2b is allocated first, then format 1/1a/1b. Format 1 schedules requests (On/Off). Format 1a comprises a 1-bit ACK/NACK. Format 1b comprises a 2-bit ACK/NACK. Format 2, normal CP, comprises CQI (up to 11 bits), while extended CP comprises CQI (up to 11 bits) and 1/2 bits of ACK/NACK. Format 2a, normal CP, comprises CQI (up to 11 bits) and 1 bit of ACK/NACK. Format 2b, normal CP, comprises CQI (up to 11 bits) and 2 bits of ACK/NACK.

For normal CP, PUCCH format 2/2a/2b signals encode up to 11 CQI bits into 20-bit sequence. Bit scrambling is used. QPSK modulation occurs with 10 QPSK symbols $s_d(0)$, $s_d(1), \ldots, s_d(9)$. 4 Pilot symbols $s_p(0), s_p(1), s_p(2), s_p(3)$ are inserted to form a 14-symbol sequence:

Format 2, $s_p(0)=s_p(1)=s_p(2)=s_p(3)=1$;

Format 2a/2b has additional 1/2 ACK/NACK bits mapped onto $s_d(10)$, $s_p(0)=s_p(2)=1$, $s_p(1)=s_p(3)=s_d(10)$.

Data and pilot symbols are spread in frequency domain by a certain cyclic shift per slot. Length 12 reference signals are multiplied in frequency domain. Both cyclic shift and reference signal may vary over slots. Cell specific cyclic shifts are applied, which vary from symbol to symbol.

Figure 8:
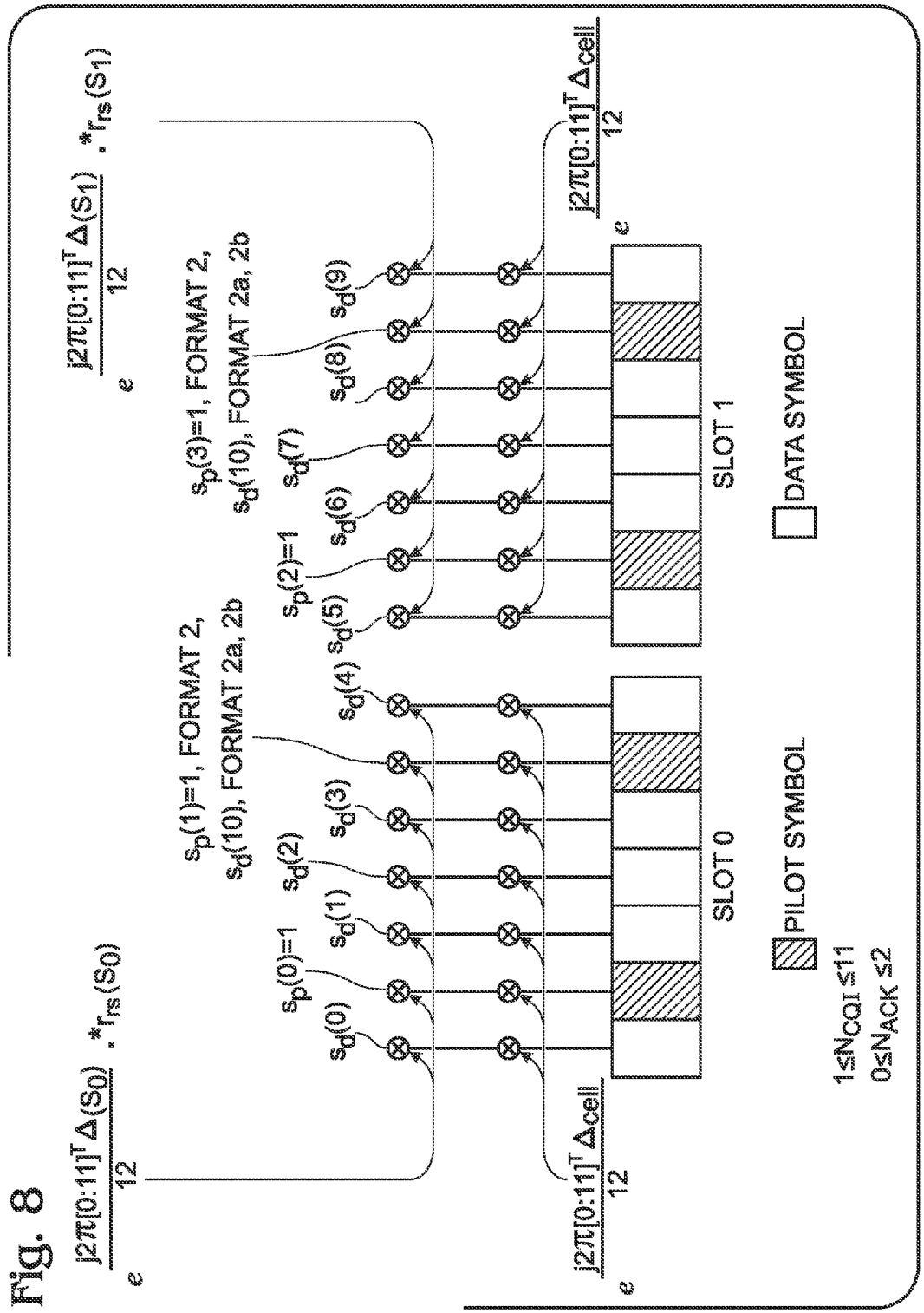
FIG. 8 is a diagram depicting PUCCH format 2/2a/2b decorrelation with normal CP.

FIG. 8 is a diagram depicting PUCCH format 2/2a/2b decorrelation with normal CP.

In extended CP, PUCCH format 2 signal encoding uses up to 11 CQI bits+0/1/2 bit ACK/NACK bits in a 20-bit sequence. ACK/NACK bits are jointly encoded. Bit scrambling is used. QPSK modulation occurs into 10 QPSK symbols $s_d(0), s_d(1), \ldots, s_d(9)$. 2 Pilot symbols $s_p(0), s_p(1)$ are inserted to form a 12-symbol sequence.

Format 2, $s_p(0)=s_p(1)=1$.

Data and pilot symbols are spread in frequency domain by a certain cyclic shift per slot. Length 12 reference signals are multiplied in the frequency domain. Both the cyclic shift and reference signals may vary over slots. Cell specific cyclic shifts are applied, which vary from symbol to symbol.

Figure 9:
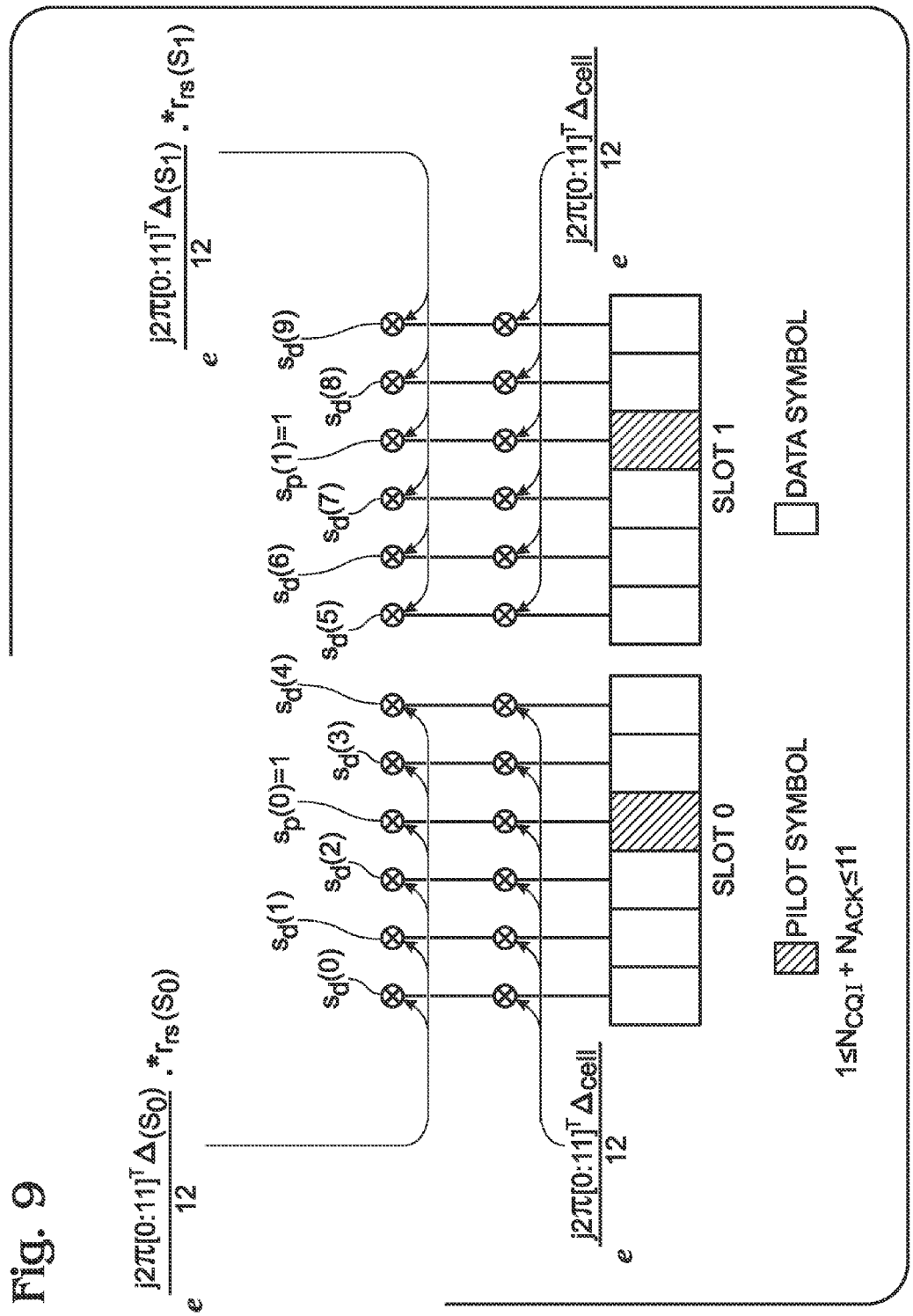
FIG. 9 is a diagram depicting PUCCH format 2/2a/2b decorrelation with extended CP.

FIG. 9 is a diagram depicting PUCCH format 2/2a/2b decorrelation with extended CP.

FIG. 10 is a diagram depicting user multiplexing in PUCCH format 2/2a/2b.

Cyclic shift creates perfect orthogonality at the transmitter end to separate different users. However, at the receiver end, different users' signals are not orthogonal due to different timing offsets and multipath fading profiles. To solve this problem, each individual user's channel is approximated as a single tap channel. This approximation is reasonable, because in each slot, the allocation only spans 12 subcarriers (180 KHz), and the typical multipath delay spread in a cellular system is much less than 1/180 KHz.

FIG. 11 is a flowchart illustrating a method for SC-FDMA PUCCH format 2/2a/2b detection in a wireless communications receiver. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Typically however, the steps are performed in numerical order. The method starts at Step 1100.

In Step 1102 a receiver accepts a plurality of multicarrier signals transmitted simultaneously from a plurality of transmitters, with overlapping carrier frequencies. For each multicarrier signal, Step 1104 performs a single tap measurement of time delay using a DoA technique. Step 1106 performs a back-end processing operation, and Step 1108 detects PUCCH 2/2a/2b format signals.

In one aspect, accepting the plurality of multicarrier signals in Step 1102 includes receiving a signal of one slot on the mth antenna, kth frequency tone, and ith SC-FDMA symbol as follows:

$$v_m(k, i) = \sum_{u=0}^{U-1} H_m^{(u)}(k, i) e^{j2\pi k \Delta_f (\Delta^{(u)} + \Delta_{cell}(i))/12} w^{(u)}(i) s^{(u)}(i) r_{rs}(k) + n_m(k, i)$$

where U is the number of multiplexed users;
$H_m^{(u)}(k,i)$ is the channel response on the kth tone of the uth user at the ith symbol on the mth antenna;
$\Delta_{cell}(i)$ is the cell specific cyclic shift on the ith symbol;
$r_{rs}(k)$ is the reference signal on the kth tone;
$\Delta_f$ is the subcarrier spacing, 15 KHz; and,
$w^{(u)}(i)$ is the orthogonal code on the ith symbol.

In a different aspect, performing the single tap measurement using the DoA technique in Step 1104 includes one of the following DoA techniques: classic beamforming, Capon beamforming, MUltiple SIgnal Classification (MUSIC), estimation of signal parameters via rotational invariance techniques (ESPRIT), alternating projection, or simplified projection. A detailed explanation of the above-listed DoA techniques is provided above in the description of the system of FIG. 6.

In one aspect, performing the back-end processing operation in Step 1106 includes performing one of the following sets of operations: (1) decorrelation, channel estimation per user, equalization per user, and decoding per user; (2) channel estimation, equalization, and decoding per user; (3) decorrelation plus maximum likelihood detection (ML) per user; or, (4) ML detection over all users.

(1) decorrelation, channel estimation per user, equalization per user, and decoding per user may include the following substeps. Step 1106*a* decorrelates in the frequency domain using a corresponding cyclic shift and estimated tap delay (Step 1104). Step 1106*b* performs a channel estimation for each user. Step 1106*c* performs equalizing using the channel estimate on decorrelated signal for each user. Step 1106*d* performs Reed Muller decoding for each user. Explicit details of the substeps have been provided above in the explanation of the system of FIG. 6.

In another aspect, (2) channel estimation, equalization, and decoding per user includes the following substeps. Step 1106*e* performs a channel estimation. Step 1106*f* performs equalization over all users (no frequency domain decorrelation being done first). Step 1106*g* performs Reed Muller decoding for each user. Explicit details of the substeps have been provided above in the explanation of the system of FIG. 6.

In another aspect, (3) decorrelation plus ML per user includes decorrelating in the frequency domain using a corresponding cyclic shift as explained in detail above (Step 1106*h*1) and ML per user (Step 1106*h*2). Likewise, details of the (4) ML over all users process (Step 1106*i*) have been provided above in the description of the system of FIG. 6.

In one aspect, performing the back-end processing operation in Step 1106 includes selecting the back-end processing operation as follows:

selecting Steps 1106*a*-1106*d*: (1) decorrelation, channel estimation per user, equalization per user, and decoding per user, with a first level of complexity and first level of performance, when number of users is not less than $T_U$, and the user's $N_{CQI} + N_{ACK} \geq T_{into}$;

selecting Steps 1106*e*-1106*g*: (2) channel estimation, equalization, and decoding per user, with a second level of complexity, greater than the first level, and a second level of performance, greater than the first level, when number of users is less than $T_U$;

selecting Steps 1106*h*1-1106*h*2: (3) decorrelation in the frequency domain, plus ML per user, when the number of users is not less than $T_U$, and the user's $N_{CQI} + N_{ACK} < T_{info}$; or, selecting Step 1106*i*: (4) ML detection for all users, with a third level of complexity, greater than the second level, and a third level of performance, greater than the second level, when the number of multiplexed users is less than $T_{U,ML}$, and the sum of users' information bits is less than $T_{info,ML}$.

In one aspect, back-end processing operation are performed by:

initially attempting to select Step 1106*i*: (4) ML detection for all users, and in response to not meeting conditions for use, selecting a back-end processing operation from a group consisting of (1) decorrelation, channel estimation per user, equalization per user, and decoding per user, (2) channel estimation, equalization, and decoding per user, and (3) decorrelation plus ML per user.

A system and method have been provided for PUCCH format 2/2a/2b signal detection. Particular mathematical algorithms have been presented as examples to illustrate the invention, but the invention is not necessarily limited to these examples. Other variations and embodiments of the invention will occur to those skilled in the art.

We claim:

1. A method for Single Carrier-Frequency-Division Multiple Access (SC-FDMA) Physical Uplink Control Channel (PUCCH) format 2/2a/2b detection, comprising:
   accepting, at a receiver, a plurality of multicarrier signals, the plurality of multicarrier signals having overlapping carrier frequencies;
   for each of the plurality of multicarrier signals, performing a single tap measurement of a time delay using a Direction of Arrival (DoA) technique by building statistics for slot pairs, comprising data and pilot signal from each antennas in each slot;
   performing a back-end processing operation based on a number of users representing a number of network devices associated with user entities and at least one of the plurality of multicarrier signals; and
   detecting PUCCH 2/2a/2b format signals.

2. The method of claim 1 wherein performing the back-end processing operation comprises performing an operation comprising (1) decorrelation, channel estimation, equalization per user, and decoding per user, (2) channel estimation, equalization, and decoding per user, (3) decorrelation plus maximum likelihood detection (ML) per user, or (4) ML detection over all users.

3. The method of claim 2 wherein (1) decorrelation, channel estimation per user, equalization per user, and decoding per user comprises:
- decorrelating in the frequency domain using a corresponding cyclic shift;
- performing a channel estimation for each user;
- performing equalizing using the channel estimate on decorrelated signal for each user; and
- performing Reed Muller decoding for each user.

4. The method of claim 3 wherein decorrelating in the frequency domain comprises:
- given tap delay estimates, modeling different users' signal as $$z_m(i) = \hat{A} H_m(i) s(i) + n_m(i)$$

where each user's signal is decorrelated by multiplying the pseudoinverse of $\hat{A}$ on left side, and for the uth user obtaining $$y_m^{(u)}(i) = h_m^{(u)}(i) s^{(u)}(i) + n_m^{(u)}(i)$$

where $\hat{A}$ differs in two slots, so that the pseudoinverse is computed twice;
wherein performing the channel estimate comprises:
after decorrelation, for each of the slots, combining $y_m^{(u)}(i)$, where i is the index of pilot symbols
for format 2 normal CP, in slot 0, performing an operation comprising (1) averaging the channel over $$y_m^{(u)}(1), y_m^{(u)}(5)$$

$$h_m^{(u)}(i) = \frac{1}{2}(y_m^{(u)}(1) + y_m^{(u)}(5)), i = 0, 2, 3, 4, 6$$

or (2) interpolating over $y_m^{(u)}(1)$, $y_m^{(u)}(5)$ $$h_m^{(u)}(i) = \frac{5-i}{4} y_m^{(u)}(1) + \frac{i-1}{4} y_m^{(u)}(5), i = 0, 2, 3, 4, 6$$

for format 2a/2b in normal CP, using $$h_m^{(u)}(i) = y_m^{(u)}(1), i = 0, 2, 3, 4, 6$$

detecting extra ACK/NACK symbols $s_d(10)$, then $$h_m^{(u)}(i) = \frac{1}{2}(y_m^{(u)}(1) + y_m^{(u)}(5) s_d(10)^*), i = 0, 2, 3, 4, 6$$

for format 2 extended CP, in slot 0, using $$h_m^{(u)}(i) = y_m^{(u)}(3), i = 0, 1, 2, 4, 5, \text{ and}$$

estimating the channel similarly for slot 1;
assuming each user's timing offset, cyclic shift, and data symbols are decorrelated as the pilot symbols, and given the channel estimation, and decorrelated signal, the equalization per user is as, $$\hat{s}(i) = \sum_{m=0}^{M-1} w_m^{(u)}(i)^* y_m^{(u)}(i)$$

with a simple MRC equalization as $$w_m^{(u)}(i) = \frac{\hat{h}_m^{(u)}(i)^*}{\sum_{m=0}^{M-1} |\hat{h}_m^{(u)}(i)|^2}.$$

5. The method of claim 2 wherein (2) channel estimation, equalization, and decoding per user comprises:
- performing a channel estimation;
- performing equalization over all users (no frequency domain decorrelation being done first; and
- performing Reed Muller decoding for each user.

6. The method of claim 5 wherein performing the channel estimation comprises:
- for the mth antenna, modeling the signal as $$z_m(i) = \hat{A} H_m(i) s(i) + n_m(i)$$

starting from subcarrier k, grouping P consecutive subcarriers, where P>=U $$\tilde{z}_{m,k}(i) = \tilde{A}_k H_{m,k}(i) s(i) + n_m(i)$$

where $\tilde{z}_{m,k}$ comprises the kth till k+P−1 th entries of $z_m$ and $\tilde{A}_k$ comprises the kth till k+P−1 th rows of $\hat{A}$
on pilot symbols, $$h_{m,k+(P-1)/2}(i) = \tilde{A}_k^+ \tilde{z}_{m,k}(i)$$

where the elements in h correspond to the diagonal elements in H
then multiple set of channel estimations can be acquired by varying k from the integers of [0, 12−P] and a frequency domain filter is applied to smoothen the estimates.

7. The method of claim 2 wherein (3) decorrelation plus ML per user comprises:
- decorrelation in the frequency domain using a corresponding cyclic shift as follows:
- given tap delay estimates, modeling different users' signal as $$z_m(i) = \hat{A} H_m(i) s(i) + n_m(i)$$

where each user's signal is decorrelated by multiplying the pseudoinverse of $\hat{A}$ on left side, and for the uth user obtaining $$y_m^{(u)}(i) = h_m^{(u)}(i) s^{(u)}(i) + n_m^{(u)}(i)$$

where $\hat{A}$ differs in two slots, so that the pseudoinverse is computed twice; and
performing ML detection for each user as follows:
dropping the superscript (u), for normal CP mode, writing symbols in the first slot as $$\begin{bmatrix} y_0(0) & \ldots & y_0(6) \\ \ldots & \ldots & \ldots \\ y_{M-1}(0) & \ldots & y_{M-1}(6) \end{bmatrix} = \begin{bmatrix} h_0(0) & \ldots & h_0(6) \\ \ldots & \ldots & \ldots \\ h_{M-1}(0) & \ldots & h_{M-1}(6) \end{bmatrix} = \begin{bmatrix} s(0) & & \\ & \ddots & \\ & & s(6) \end{bmatrix} + \text{noise}$$

and for extended CP as $$\begin{bmatrix} y_0(0) & \ldots & y_0(5) \\ \ldots & \ldots & \ldots \\ y_{M-1}(0) & \ldots & y_{M-1}(5) \end{bmatrix} = \begin{bmatrix} h_0(0) & \ldots & h_0(5) \\ \ldots & \ldots & \ldots \\ h_{M-1}(0) & \ldots & h_{M-1}(5) \end{bmatrix} = \begin{bmatrix} s(0) & & \\ & \ddots & \\ & & s(5) \end{bmatrix} + \text{noise}$$

decomposing into a channel matrix selected from a group consisting of:

$$\begin{bmatrix} h_0(0) & \ldots & h_0(6) \\ \ldots & \ldots & \ldots \\ h_{M-1}(0) & \ldots & h_{M-1}(6) \end{bmatrix} = \tilde{H}G \quad (1)$$

for normal CP mode and, $$\begin{bmatrix} h_0(0) & \ldots & h_0(5) \\ \ldots & \ldots & \ldots \\ h_{M-1}(0) & \ldots & h_{M-1}(5) \end{bmatrix} = \tilde{H}G \quad (2)$$

for extended CP mode;
rewriting the previous equation as $$Y = \tilde{H}GS + W$$

where W is noise with covariance matrix R; and
in normal CP, choosing G to be a matrix comprising a 2×7 matrix or a 1×7 matrix, representing a linearly varying channel and a constant channel, respectively, as follows:

$$G = \begin{bmatrix} 1 & 5/6 & 4/6 & 3/6 & 2/6 & 1/6 & 0 \\ 0 & 1/6 & 2/6 & 3/6 & 4/6 & 5/6 & 1 \end{bmatrix}$$

$$G = \begin{bmatrix} 1 & 1 & 1 & 1 & 1 & 1 & 1 \end{bmatrix}$$

in extended CP mode, choosing G to be a matrix comprising a 2×6 matrix or a 1×6 matrix, representing a linearly varying channel and a constant channel, respectively,
given S, $$G = \begin{bmatrix} 1 & 4/5 & 3/5 & 2/5 & 1/5 & 1 \\ 0 & 1/5 & 2/5 & 3/5 & 4/5 & 1 \end{bmatrix}$$

$$G = \begin{bmatrix} 1 & 1 & 1 & 1 & 1 & 1 \end{bmatrix}$$

$\tilde{H}$ is estimated as
S is searched to perform an operation comprising: (1) minimizing $$\tilde{H} = YS^H G^T (GG^T)^{-1}$$

$$L = \sum_{slot=0}^{1} \left\| R^{-\frac{1}{2}} YS^H (I - G^T(GG^T)^{-1}G)S \right\|_F^2$$

or (2) maximizing $$\sum_{slot=0}^{1} Tr(YS^H G^T(GG^T)^{-1} GSY^H R^{-1}).$$

8. The method of claim 2 wherein (4) ML over all users comprises:
rewriting the ith symbol as $$\begin{bmatrix} z_0(i) \\ \vdots \\ z_{M-1}(i) \end{bmatrix} = \begin{bmatrix} \hat{A}H_0(i) \\ \vdots \\ \hat{A}H_{M-1}(i) \end{bmatrix} s(i) + \begin{bmatrix} n_0(i) \\ \vdots \\ n_{M-1}(i) \end{bmatrix}$$

-continued $$= \begin{bmatrix} \hat{A} & & \\ & \ddots & \\ & & \hat{A} \end{bmatrix} \begin{bmatrix} S(i) & & \\ & \ddots & \\ & & S(i) \end{bmatrix} \begin{bmatrix} h_0(i) \\ \vdots \\ h_{M-1}(i) \end{bmatrix} + \begin{bmatrix} n_0(i) \\ \vdots \\ n_{M-1}(i) \end{bmatrix}$$

where S(i) is the diagonal matrix whose diagonal entries comprise all corresponding elements of s(i);
defining $\tilde{z}, \tilde{A}, \tilde{S}, \tilde{h}, \tilde{n}(i)$ as shown in the above equation, and therefore $$\tilde{z}(i) = \tilde{A}\tilde{S}(i)\tilde{h}(i) + \tilde{n}(i)$$

solving for all possible $s^{(u)}(i)$ that minimizes $$L = \sum_{slot=0}^{1} \sum_{i=0}^{N-1} \left\| \tilde{z}(i) - \tilde{A}\tilde{S}(i)\tilde{h}(i) \right\|^2$$

assuming the channel is constant over one slot, $$\begin{bmatrix} \tilde{z}(0) \\ \vdots \\ \tilde{z}(N-1) \end{bmatrix} = \begin{bmatrix} \tilde{A}\tilde{S}(0) \\ \vdots \\ \tilde{A}\tilde{S}(N-1) \end{bmatrix} \tilde{h} + \begin{bmatrix} \tilde{n}(0) \\ \vdots \\ \tilde{n}(N-1) \end{bmatrix}$$

where N is the number of symbols per slot;
using the solution of $s^{(u)}(i)$ to maximize $$\tilde{L} = \sum_{slot=0}^{1} \left( \sum_{i=0}^{N-1} \tilde{z}(i)^H \tilde{A}\tilde{S}(i) \right) \left( \sum_{i=0}^{N-1} \tilde{S}(i)^H \tilde{A}^H \tilde{A}\tilde{S}(i) \right)^{-1} \left( \sum_{i=0}^{N-1} \tilde{S}(i)^H \tilde{A}^H \tilde{z}(i) \right).$$

9. The method of claim 2 wherein performing the back-end processing operation comprises selecting the back-end processing operation as follows:
selecting (1) decorrelation, channel estimation per user, equalization per user, and decoding per user, with a first level of complexity and first level of performance, when the number of users is not less than $T_U$, and the user's $N_{CQI} + N_{ACK} \geq T_{info}$;
selecting (2) channel estimation, equalization, and decoding per user, with a second level of complexity, greater than the first level, and a second level of performance, greater than the first level, when the number of users is less than TU;
selecting (3) decorrelation plus ML per user when the number of users is not less than $T_U$, and the user's $N_{CQI} + N_{ACK} < T_{info}$; and
selecting (4) ML detection for all users, with a third level of complexity, greater than the second level, and a third level of performance, greater than the second level, when conditions for use are satisfied, wherein the conditions for use comprise the number of multiplexed users being less than $T_{U,ML}$, and the sum of users' information bits being less than $T_{info,ML}$.

10. The method of claim 9 wherein performing the back-end processing operation comprises:
initially attempting to select (4) ML detection for all users, and in response to not meeting the conditions for use, selecting a back-end processing operation from a group consisting of (1) decorrelation, channel estimation per user, equalization per user, and decoding per user, (2)

channel estimation, equalization, and decoding per user, and (3) decorrelation plus ML per user.

11. The method of claim 1 wherein performing the single tap measurement using the DoA technique comprises using a DoA technique comprising classic beamforming, Capon beamforming, MUltiple Signal Classification (MUSIC), estimation of signal parameters via rotational invariance techniques (ESPRIT), alternating projection, or simplified projection.

12. The method of claim 11 wherein performing the single tap measurement using the DoA technique comprises using the classic beamforming algorithm by building the statistics for slot pairs, comprising the data and the pilot signal from each of the antennas in each of the slots, as follows:

$$\tilde{Z}=[z_0(0),z_1(0),\ldots,z_{M-1}(0),\ldots,z_0(N-1),z_1(N-1),\ldots,z_{M-1}(N-1)]$$

computing metrics $$\lambda^{(u)}(\tau) = \left\|\tilde{Z}a^H\left(\tau\Delta_f - \frac{\Delta^{(u)}}{12}\right)\right\|^2,$$

where a is the steering vector;

peak picking to estimate $\tau^{(u)}$ using computed spectrums from both slot within a given range $$\hat{\tau}^{(u)} = \arg\max_{\tau\in[\tau_{min},\tau_{max}]} \lambda_{s_0}^{(u)}(\tau) + \lambda_{s_1}^{(u)}(\tau)$$

where the subscripts $s_0$ and $s_1$ represents slot 0 and slot 1.

13. The method of claim 11 wherein performing the single tap measurement using the DoA technique comprises using the alternating projection algorithm by building the statistics for slot pairs, comprising the data and the pilot signal from each of the antennas in each of the slots, as follows:

for each user, setting initial estimates to $\hat{\tau}^{(u)}$;
iteratively update each user's estimate $$\hat{\tau}^{(u)} = \arg\max_{\tau\in[\tau_{min},\tau_{max}]} \lambda_{s_0}^{(u)}(\tau) + \lambda_{s_1}^{(u)}(\tau)$$

where the subscripts $s_0$ and $s_1$ represents slot 0 and slot 1, computing a spectrum, per slot, based on steering vectors projected onto the null space of $$\left\{a\left(\tau^{(\tilde{u}_0)}\Delta_f - \frac{\Delta^{(\tilde{u}_0)}}{12}\right),\ldots,a\left(\tau^{(\tilde{u}_{K-2})}\Delta_f - \frac{\Delta^{(\tilde{u}_{K-2})}}{12}\right)\right\}$$

where $\tilde{u}_0,\ldots,\tilde{u}_{K-2}$ are all users but excluding u given $$\tilde{A}_u = \left[a\left(\tau^{(\tilde{u}_0)}\Delta_f - \frac{\Delta^{(\tilde{u}_0)}}{12}\right),\ldots,a\left(\tau^{(\tilde{u}_{K-2})}\Delta_f - \frac{\Delta^{(\tilde{u}_{K-2})}}{12}\right)\right]$$

computing a projection matrix $$P_u = I - \tilde{A}_u(\tilde{A}_u^H\tilde{A}_u)^{-1}\tilde{A}_u^H$$

projecting and normalizing a steering vector $$b_u(\theta) = \frac{P_u a(\theta)}{\|P_u a(\theta)\|} \text{ computing}$$

$$\lambda^{(u)}(\tau) = \left\|\tilde{Z}b_u^H\left(\tau\Delta_f - \frac{\Delta^{(u)}}{12}\right)\right\|^2$$

and updating $\tilde{\tau}^{(u)}$; and
repeating the above-listed steps until a stopping criteria is met.

14. The method of claim 11 wherein performing the single tap measurement using the DoA technique comprises using the simplified projection algorithm by building the statistics for slot pairs, comprising the data and the pilot signal from each of the antennas in each of the slots, as follows:

setting a common initial estimate for each user;
for each user, using the simplified projection method to estimate $\tilde{\tau}^{(u)}$, given initial estimates $$b_u(\theta) = \frac{P_u a(\theta)}{\|P_u a(\theta)\|}$$

$$P_u = I - \tilde{A}_u(\tilde{A}_u^H\tilde{A}_u)^{-1}\tilde{A}_u^H$$

where $\tilde{A}_u$ has orthogonal rows and $\tilde{A}_u^H\tilde{A}_u$ is a simple identity matrix.

15. The method of claim 1 wherein accepting the plurality of multicarrier signals comprises receiving a signal of one slot on the mth antenna, kth frequency tone, and ith SC-FDMA symbol as follows:

$$v_m(k,i) = \sum_{u=0}^{U-1} H_m^{(u)}(k,i)e^{j2\pi k\Delta_f(\Delta^{(u)}+\Delta_{cell}(i))/12}s^{(u)}(i)r_{rs}(k) + n_m(k,i)$$

where U is the number of multiplexed users;
$H_m^{(u)}(k,i)$ is the channel response on the kth tone of the uth user at the ith symbol on the mth antenna;
$\Delta_{cell}(i)$ is the cell specific cyclic shift on the ith symbol;
$r_{rs}(k)$ is the reference signal on the kth tone; and,
$\Delta_f$ is the subcarrier spacing, 15 KHz.

16. The method of claim 1 wherein performing the single tap measurement comprises approximating each of the plurality of multicarrier signals as follows:

$$z_m(i) = AH_m(i)s(i) + n_m(i)$$

where
$i=0, 1, \ldots, N-1$, where N is the number of symbols per slot in time domain $$A = \left[a\left(\tau^{(u_0)}\Delta_f - \frac{\Delta^{(u_0)}}{12}\right),\ldots,a\left(\tau^{(u_{K-1})}\Delta_f - \frac{\Delta^{(u_{K-1})}}{12}\right)\right]$$

$$a(t) = [1 \quad e^{-j2\pi t} \quad \ldots \quad e^{-j2\pi 11 t}]^T$$

where $u_0, \ldots, u_{K-1}$ are the indexes of the users;
where A comprises steering vectors corresponding to user $u_0, \ldots, u_{K-1}$;

where $H_m(i)$ is a diagonal matrix whose elements are the single tap channel responses on the ith symbol on the mth antenna of user $u_0, \ldots, u_{K-1}$;
where $a(t)$ is a length 12 steering vector
where $\tau$ is a tap delay of a particular user
where $\Delta$ is a cyclic shift of a particular user;
where $s(i)$ is the transmitted data or pilot on the ith symbol corresponding to user $u_0, \ldots, u_{K-1}$; and
where $n_m(i)$ is the noise vector on the ith symbol and mth antenna.

17. A method for Single Carrier-Frequency-Division Multiple Access (SC-FDMA) Physical Uplink Control Channel (PUCCH) format 2/2a/2b detection, comprising:
accepting, at a receiver, a plurality of multicarrier signals with overlapping carrier frequencies and overlapping transmission times;
for each of the plurality of multicarrier signals, performing a single tap measurement of time delay using a Direction of Arrival (DoA) technique by building statistics for slot pairs, comprising data and pilot signal from each antennas in each slot;
performing, based on the single tap measurement of time day for each of the plurality of multicarrier signals, a back-end processing operation comprising decorrelation, channel estimation, equalization per user, and decoding per user; and
detecting PUCCH 2/2a/2b format signals.

18. The method of claim 17 wherein decorrelation, channel estimation per user, equalization per user, and decoding per user comprises:
decorrelating in the frequency domain using a corresponding cyclic shift;
performing a channel estimation for each user;
performing equalizing using the channel estimate on decorrelated signal for each user; and
performing Reed Muller decoding for each user.

19. The method of claim 18 wherein decorrelating in the frequency domain comprises:
given tap delay estimates, modeling different users' signal as $$z_m(i) = \hat{A} H_m(i) s(i) + n_m^{(u)}(i)$$

where each user's signal is decorrelated by multiplying the pseudoinverse of $\hat{A}$ on left side, and for the uth user obtaining $$y_m^{(u)}(i) = h_m^{(u)}(i) s^{(u)}(i) + n_m^{(u)}(i)$$

where $\hat{A}$ differs in two slots, so that the pseudoinverse is computed twice;
wherein performing the channel estimate comprises:
after decorrelation, for each slot, combining $y_m^{(u)}(i)$, where i is the index of pilot symbols
for format 2 normal CP, in slot 0, performing an operation comprising (1) averaging the channel over $$y_m^{(u)}(1), y_m^{(u)}(5)$$

$$h_m^{(u)}(i) = \frac{1}{2}(y_m^{(u)}(1) + y_m^{(u)}(5)), i = 0, 2, 3, 4, 6$$

or (2) interpolating over $y_m^{(u)}(1), y_m^{(u)}(5)$ $$h_m^{(u)}(i) = \frac{5-i}{4} y_m^{(u)}(1) + \frac{i-1}{4} y_m^{(u)}(5), i = 0, 2, 3, 4, 6$$

for format 2a/2b in normal CP, using $$h_m^{(u)}(i) = y_m^{(u)}(1), i = 0, 2, 3, 4, 6$$

detecting extra ACK/NACK symbols $s_d(10)$, then $$h_m^{(u)}(i) = \frac{1}{2}(y_m^{(u)}(1) + y_m^{(u)}(5) s_d(10)^*), i = 0, 2, 3, 4, 6$$

for format 2 extended CP, in slot 0, using $$h_m^{(u)}(i) = y_m^{(u)}(3), i = 0, 1, 2, 4, 5, \text{ and,}$$

estimating the channel similarly for slot 1;
assuming each user's timing offset, cyclic shift, and data symbols are decorrelated as the pilot symbols, and given the channel estimation, and decorrelated signal, the equalization per user is as, $$\hat{s}(i) = \sum_{m=0}^{M-1} w_m^{(u)}(i)^* y_m^{(u)}(i)$$

with a simple MRC equalization as $$w_m^{(u)}(i) = \frac{\hat{h}_m^{(u)}(i)^*}{\sum_{m=0}^{M-1} |\hat{h}_m^{(u)}(i)|^2}.$$

20. A method for Single Carrier-Frequency-Division Multiple Access (SC-FDMA) Physical Uplink Control Channel (PUCCH) format 2/2a/2b detection, comprising:
receiving, at a receiver, a plurality of multicarrier signals transmitted simultaneously, with overlapping carrier frequencies;
for each of the plurality of multicarrier signals, performing a single tap measurement of time delay using a Direction of Arrival (DoA) technique by building statistics for slot pairs, comprising data and pilot signal from each antennas in each slot;
performing, based on a model representing a multicarrier signal of the plurality of multicarrier signals, a back-end processing operation comprising channel estimation, equalization, and decoding per user; and
detecting PUCCH 2/2a/2b format signals.

21. The method of claim 20 wherein channel estimation, equalization, and decoding per user comprises:
performing a channel estimation;
performing equalization over all users before frequency domain decorrelation; and
performing Reed Muller decoding for each user.

22. The method of claim 21 wherein performing the channel estimation comprises:
for the mth antenna, modeling the signal as $$z_m(i) = \hat{A} H_m(i) s(i) + n_m(i)$$

starting from subcarrier k, grouping P consecutive subcarriers, where P>=U $$\tilde{z}_{m,k}(i) = \tilde{A}_k H_{m,k}(i) s(i) + n_m(i)$$

where $\tilde{z}_{m,k}$ comprises the kth till k+P−1 th entries of $z_m$ and $\tilde{A}_k$ comprises the kth till k+P−1 th rows of $\hat{A}$
on pilot symbols, $$h_{m,k+(P-1)/2}(i) = \tilde{A}_k^+ \tilde{z}_{m,k}(i)$$

where the elements in h correspond to the diagonal elements in H then multiple set of channel estimations can be acquired by varying k from the integers of [0, 12−P] and a frequency domain filter is applied to smoothen the estimates.

\* \* \* \* \*